United States Patent
Orban et al.

(10) Patent No.: US 6,847,896 B1
(45) Date of Patent: Jan. 25, 2005

(54) SEISMIC DATA ACQUISITION METHOD AND APPARATUS

(75) Inventors: Jacques Joseph Henri Orban, JAR (NO); Kjell Hatteland, Roeyken (NO)

(73) Assignee: Westerngeco, L.L.C., Houston, TX (US)

( * ) Notice: Subject to any disclaimer, the term of this patent is extended or adjusted under 35 U.S.C. 154(b) by 0 days.

(21) Appl. No.: 09/807,719

(22) PCT Filed: Oct. 21, 1999

(86) PCT No.: PCT/IB99/01724
§ 371 (c)(1),
(2), (4) Date: Jul. 13, 2001

(87) PCT Pub. No.: WO00/26694
PCT Pub. Date: May 11, 2000

(30) Foreign Application Priority Data

Nov. 3, 1998 (GB) .............................. 9823941
Nov. 3, 1998 (GB) .............................. 9823944

(51) Int. Cl.[7] .............................................. G01V 1/00
(52) U.S. Cl. ...................................... 702/14; 367/118
(58) Field of Search ........................... 702/14; 367/118, 367/127, 129; 181/109

(56) References Cited

U.S. PATENT DOCUMENTS

| | | | | |
|---|---|---|---|---|
| 3,547,218 A | * | 12/1970 | Hamilton .................... | 181/109 |
| 4,409,899 A | * | 10/1983 | Owen et al. ................. | 102/211 |
| 4,630,246 A | * | 12/1986 | Fogler ........................ | 367/135 |
| 4,775,028 A | * | 10/1988 | de Heering ................. | 181/124 |
| 4,811,308 A | * | 3/1989 | Michel ........................ | 367/136 |
| 4,890,264 A | * | 12/1989 | Crews et al. ................ | 367/45 |
| 5,128,904 A | * | 7/1992 | Chambers ................... | 367/129 |
| 5,161,127 A | * | 11/1992 | Grosch ........................ | 367/124 |
| 5,276,655 A | * | 1/1994 | Rialan et al. ................ | 367/76 |
| 6,381,544 B1 | * | 4/2002 | Sallas et al. ................. | 702/17 |
| 6,760,275 B2 | * | 7/2004 | Carstensen .................. | 367/83 |
| 6,791,901 B1 | * | 9/2004 | Robertsson et al. ......... | 367/58 |

* cited by examiner

*Primary Examiner*—Donald E. McElheny, Jr.
*Assistant Examiner*—Anthony Gutierrez
(74) *Attorney, Agent, or Firm*—Jeffrey E. Griffin

(57) ABSTRACT

A method of acquiring seismic data adapted for a land or transition zone environment including placing a location identifier in a particular location, placing a seismic sensor near the location identifier, reading the location identifer using a seismic data cable, recording seismic data acquired by the seismic sensor using the seismic data cable, and assigning sensor position coordinates to the seismic data based on measured position coordinates of the location identifier. The invention also includes an apparatus adapted for seismic data acquisition in a land or transition zone environment including a location identifier, a seismic senor capable of being placed near the location identifier, a seismic data cable, means for reading the location identifier using the seismic data cable, means for recording seismic data acquired by the seismic sensor using the seismic data cable, and means for assigning sensor position coordinates to the seismic data based on measured position coordinates of the location identifier.

45 Claims, 4 Drawing Sheets

SEISMIC DATA ACQUISITION METHOD AND APPARATUS

BACKGROUND OF THE INVENTION

The present invention re lates to a seismic data acquisition method and apparatus and in particular to a seismic data acquisition method and apparatus adapted for use in a land or transition zone environment th at provides for improved seismic sensor position determination, thereby reducing perturbation noise generated by inaccurate assignment of seismic sensor position coordinates to seismic data.

Seismic data is collected to remotely sense subsurface geologic conditions, particularly in connection with the exploration for and production of hydrocarbon reserves, such as oil, natural gas, or coal. To gather seismic data, acoustic sources such as explosives or vibrators are used to produce an acoustic pulse that is transmitted through the subsurface geologic formations. Changes in acoustic impedance between different geologic layers cause a portion of the acoustic energy to be reflected and returned toward the earth's surface. These reflected signals are received by seismic sensors and are processed to create images of the subsurface geology.

Seismic data is typically acquired on land using strings of seismic sensors that are known as geophones. The geophone string is laid over a certain area in a given pattern. This pattern could either be linear or it could be a spatial pattern covering a certain area (typically 50 by 50 meters) with its center of gravity located in a predetermined position. This group of seismic sensors is typically called a station and the center of gravity is referred to as a station location.

A seismic data acquisition system can control and acquire data from a large number of seismic stations. In a two dimensional (2D) application, the stations are laid in one line which could include 1000 stations covering up to 50 kilometers. In a three dimensional (3D) application, the stations are typically organized in several parallel lines. Each line in a 3D seismic survey is similar to the line of a 2D application, with a typical line being perhaps 5 kilometers in length and each line including on the order of 100 or so stations. Between five to twenty lines, for instance, could be active at any given time during a 3D survey and they will typically be connected to a single set of seismic data recording equipment. Adjacent lines of a 3D survey could be separated by between 300 and 1000 meters, for instance.

A large 3D system can control 3000 or more stations at any time. Within a station, the grouping of the data from individual geophones attenuate noises such as horizontally traveling waves (ground roll) and random noises. Random noises can be generated by wind, rain, scratching of the geophone case by vegetation, geophone cable oscillation, etc. The level of noise attenuation depends, in part, on the pattern used. The data from multiple stations will be processed later on to provide the seismic image of the subsurface geology.

In a typical land seismic acquisition process, a 3D seismic survey is first planned to account for the client's geophysical objectives and to attempt to minimize terrain constraints on the seismic survey. The 3D seismic survey plan will generally include a seismic sensor lay-out scheme (including identifying all of the planned seismic station locations and the sensor lay out pattern) and a seismic source deployment scheme.

A survey crew will then travel to the seismic survey location to determine the positions on the earth's surface where the stations will be laid. The survey crew typically plants a survey peg (a small flag) at the center of each station. This peg is characterized by a unique identifier, a peg index. The surveyors then generate a correspondence table between the peg index values and the station coordinate values.

Later, the lay-out crew attempts to install the geophone string in the proper pattern, while visually ensuring that the center of gravity of the pattern is at the peg. The geophone string is then connected to a cable "take-out" connector of a seismic data transmission cable. In most case, the peg index (or station reference) and the electronics address on the seismic data transmission cable are incremented in the same pattern. However this is not always possible.

In the real world, many problems can occur that can generate errors when the position coordinates of the seismic station locations are matched with the acquisition channels of the seismic data acquisition system. With complex lay-out in difficult terrain, some acquisition channels may not be used to allow the bypassing of obstacles. The number of skipped take-out connectors must be properly recorded by the lay-out crew and transmitted to the recording computer so that this information can be used to properly map the relationship between the station location and the electronic channel address. In 3D applications, the line definition based on the electronic acquisition channel does not always represent the seismic line configuration on the ground. In fact, a single physical line cable can be folded to represent multiple seismic data acquisition lines. With the complex network structures in new seismic data acquisition systems, various network layers can be used to physically communicate to a given acquisition channel: this allows a large flexibility for the lay-out operation (i.e. a large contour). In these cases, the electronic addressing scheme does not represent the seismic line lay-out.

A similar problem occurs if a cross-line or backbone cable is used to transmit seismic data from a seismic data cable to the recording equipment. If the take-out at which the backbone cable is joined to the seismic data cable is not properly recorded and accounted for, it is possible to improperly shift the coordinate values attributed to the seismic data acquired by seismic sensors recorded using the seismic data cable.

The mapping between the electronic address and seismic station reference is conventionally performed at the central seismic recorder using information from the survey team, the lay-out team and the network definition. This logic can easily be corrupted. Errors generate major perturbations in the seismic processing, and the image quality of the processed seismic data can thereby be drastically decreased.

The quality of the seismic image obtained from the seismic data is also affected by other geometry problems. The center of gravity of the seismic sensor group should be as close as possible to the survey peg; otherwise the seismic image will be blurred. Seismic data is typically processed using algorithms that rely on accurate information regarding the position coordinates of the seismic sensors used to acquire the seismic data. When the actual sensor position coordinates differ from the sensor position coordinates that are assigned to the seismic data, the processing algorithms will often fail to correctly perform the intended data processing operation, and may in fact introduce noise or processing artifacts into the processed seismic data. The non-optimum group pattern may also limit the performance of some types of processing intended to reduce noise (especially operations intended to reduce coherent noise such as ground roll noise).

Group patterns and the group center of gravity are not always within acceptable tolerances, as the lay-out of the geophones are based on visual judgments of distance and position performed by a seismic crew member. There is currently very little quality control performed regarding geophone positioning. Sensor positioning errors (i.e. associating incorrect seismic sensor position coordinates with seismic data) typically generate noise behind the signal.

In a theoretical study performed to predict the level of noise that could be caused by various perturbations in a uniform spatial sampling seismic data acquisition system, perturbation noise was calculated before and after seismic processing which provided the following signal to noise ratios:

10% amplitude perturbation on a single geophone≈30 dB 1 millisecond static on a single geophone≈20 dB 0.5 meter difference in position of a single geophone≈40 dB 5 meter difference in position of group center≈20 dB After processing (DM0-stack) the noise level is reduced independent of the kind of perturbation by about 14 dB, which is expected from coverage of 20 to 60 fold. Doubling the amount of perturbations nearly results in a 6 dB increase of the perturbation noise before and after processing. With this study, it is clear that small positioning errors generate clear perturbations in the expected signal to noise ratios of seismic data. Major noise has to be expected when substantially incorrect seismic sensor positions are assigned to seismic data. While this study looks at only one particular case, it clearly shows the relative importance of these types of seismic data acquisition errors.

There are two primary types seismic sensor positioning errors that need to be corrected or prevented during seismic data acquisition. First, inaccurate matching of survey information with the physical deployment of a particular geophone string (i.e. the electronic acquisition channel of the seismic data acquisition system) has to be suppressed. This is achieved in the inventive method and apparatus by remotely detecting survey peg information on a particular seismic data acquisition channel. This type of correction or cross-checking is typically performed before the seismic data is acquired by the seismic sensors.

Second, induced noise in the seismic image due to improper correspondence between the assumed and actual positions of the geophones at each station, such as differences between the actual and the planned positions of the center of gravity of the geophone string, has to be reduced. To reduce these differences, the inventive method and apparatus provides for airborne acoustic positioning to determine the actual 2D positions of the geophones after lay-out. As a basic quality control procedure, geophones outside the adequate positioning tolerances can be identified and their position can either be corrected for, or the data from these sensors can be ignored.

A more sophisticated approach is to reposition the center of gravity of the group during digital data grouping output, using adequate mathematical compensation schemes. The subsequent seismic processing sequence can thus be modified or adapted to compensate for deviations between the planned position and the actual position of the group center of gravity. Digital filtering for noise attenuation and some types of seismic processing procedures depend of the geometry of the seismic sensor group. Suitable adjustments can be made to these processes to compensate for deviations between the optimum or assumed positions and the actual deployed positions. For example, if the geophones of a particular group are laid in a bunched fashion due to terrain constraints, the digital filter control parameters can be modified, or the digital filtering process can be skipped altogether for the seismic data acquired by the geophones in this group.

It is therefore an object of the present invention to provide for an improved method and apparatus for seismic sensor position determination.

An advantage of the described embodiment of the present invention is that the seismic sensors can be installed with larger tolerances, insuring easier and faster lay-out.

Another advantage of the described embodiment of the present invention is that the data quality can be higher after adequately correcting for any deviations between the planned seismic sensor deployment and the actual seismic sensor deployment.

A further advantage of the described embodiment of the present invention is that the likelihood of inaccurately assigning seismic sensor position coordinates to seismic data can be significantly reduced.

SUMMARY OF THE INVENTION

In one aspect, the present invention involves a method of acquiring seismic data adapted for a land or transition zone environment including placing a location identifier in a particular location, placing a seismic sensor near the location identifier, reading the location identifier using a seismic data cable, recording seismic data acquired by the seismic sensor using the seismic data cable, and assigning sensor position coordinates to the seismic data based on measured position coordinates of the location identifier.

In another aspect, the present invention involves an apparatus adapted for seismic data acquisition in a land or transition zone environment including a location identifier, a seismic sensor capable of being placed near the location identifier, a seismic data cable, means for reading the location identifier using the seismic data cable, means for recording seismic data acquired by the seismic sensor using the seismic data cable, and means for assigning sensor position coordinates to the seismic data based on measured position coordinates of the location identifier.

In yet another aspect, the present invention involves an apparatus adapted for seismic data acquisition in a land or transition zone environment including a positioning device, a seismic sensor capable of being placed near the positioning device, and means for determining the distance between the seismic sensor and the positioning device using an airborne acoustic transmission between the positioning device and the seismic sensor.

In a still further aspect, the present invention involves a method of determining the position of a seismic sensor adapted for seismic data acquisition in a land or transition zone environment including the steps of placing a positioning device in a particular location, placing a seismic sensor near the positioning device, and determining the distance between the seismic sensor and the positioning device using an airborne acoustic transmission between the positioning device and the seismic sensor.

The invention and its benefits will now be described, by way of example only, with reference to the accompanying drawings.

DETAILED DESCRIPTION OF THE INVENTION

Figure 1:
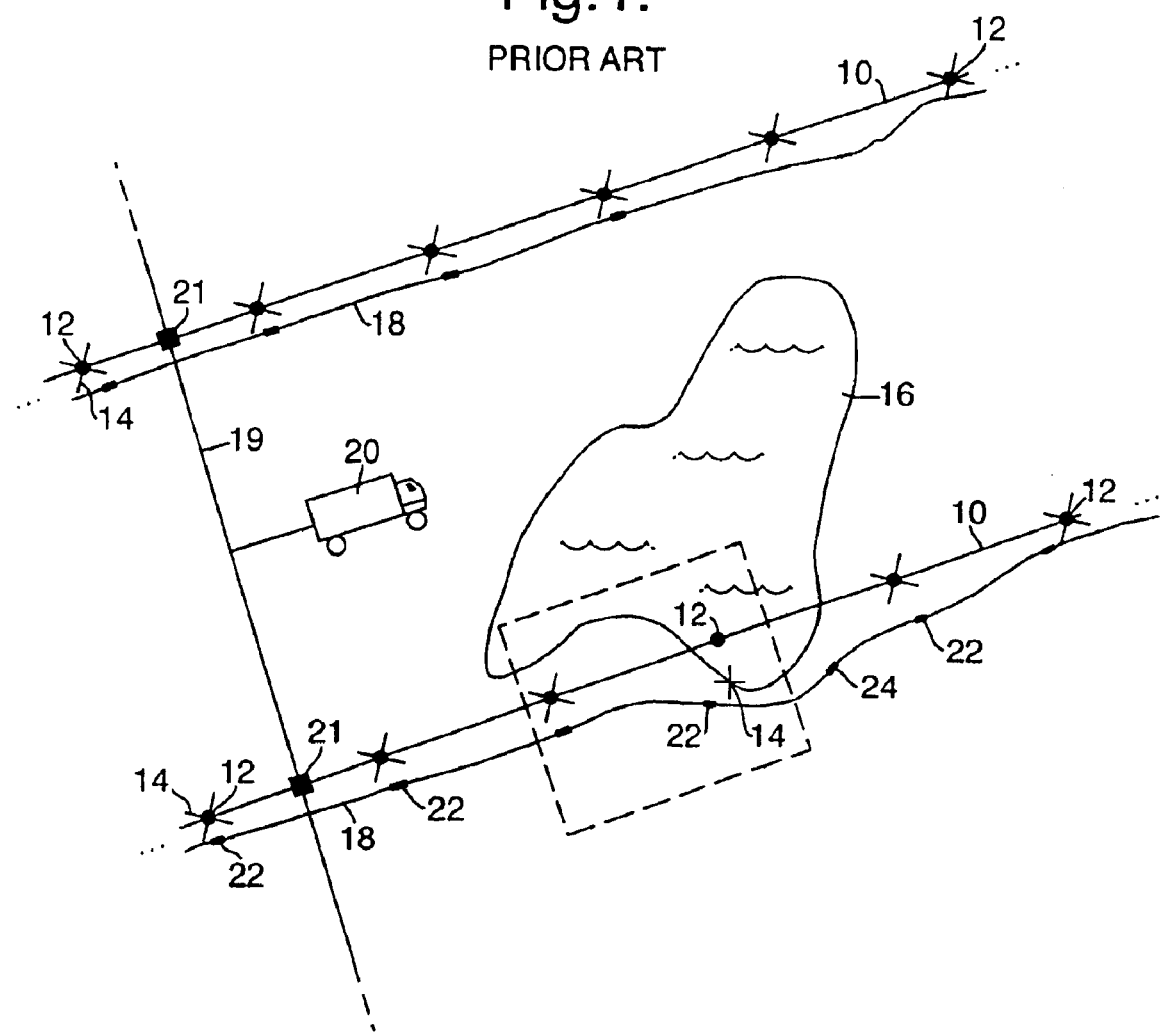
FIG. 1 is a schematic diagram of a portion of a 3D seismic survey sensor lay-out scheme.

FIG. 1 shows a schematic view of a portion of a 3D seismic survey sensor lay-out scheme in a land environment. A plurality of parallel lines 10 are laid down over a particular geographic area and a number of pre-planned seismic survey station locations 12 are positioned at regular intervals along their lengths. It should be understood that only a portion of the entire 3D seismic survey sensor lay-out scheme is shown in FIG. 1. As discussed above, each line in a typical 3D seismic survey may be five kilometers in length and may including 100 stations. There may be between five to twenty active lines in a typical 3D seismic survey and the spacing between the lines may be on the order of 300 to 1000 meters or so.

In the first phase of the seismic data acquisition process, a layout plan is created that determines where the lines 10 should be placed on the surface of the earth to obtain an "optimal" (in some geophysical sense) seismic image of the subsurface area of interest. In this first phase, the required line spacing (i.e. the distance between adjacent lines 10) and the required station spacing (i.e. the distance between adjacent seismic survey station locations 12 on a particular line 10) will be selected which will allow the acquired seismic data to have the spatial resolution/image quality required to perform the type of geological analysis desired.

In the second phase of the seismic data acquisition process, a survey crew has placed survey pegs 14 as close as possible (based on the field conditions and the accuracy of the survey equipment) to the desired station locations 12. In many cases, a survey peg 14 can be located at or near the precise spot planned for the seismic survey station location 12, but in some cases, the survey peg will be located offset from the desired location, typically due to terrain factors such as a lake 16 in FIG. 1. Other types of obstacles that may need to be bypassed during a seismic survey include buildings, fences, rock outcrops, trees, etc.

In the third phase, seismic data cables 18 have been placed along lines 10 by a sensor lay-out crew. A high-speed backbone cable 19 (also referred to as a cross-line cable) is connected to a recording truck 20 and to each of the seismic data cables 18, typically using master router units attached at backbone take-outs 21. The backbone cable 19 is used to transmit seismic data from the seismic data cables 18 to the recording truck 20. A string of geophones (not shown in FIG. 1) are then distributed about survey pegs 14 by the sensor lay-out crew and are connected to seismic data cables 18 at cable take-outs 22. When a seismic source is actuated, equipment within recording truck 20 records the digitized geophone output data. The geophone output comprises seismic data that is used to create seismic images of the geologic subsurface. Due to the lake 16 and the fixed distance between cable takeouts 22 on seismic data cables 18, one cable take-out has not been used and this is labeled in FIG. 1 as by-passed cable take-out 24.

Figure 2:
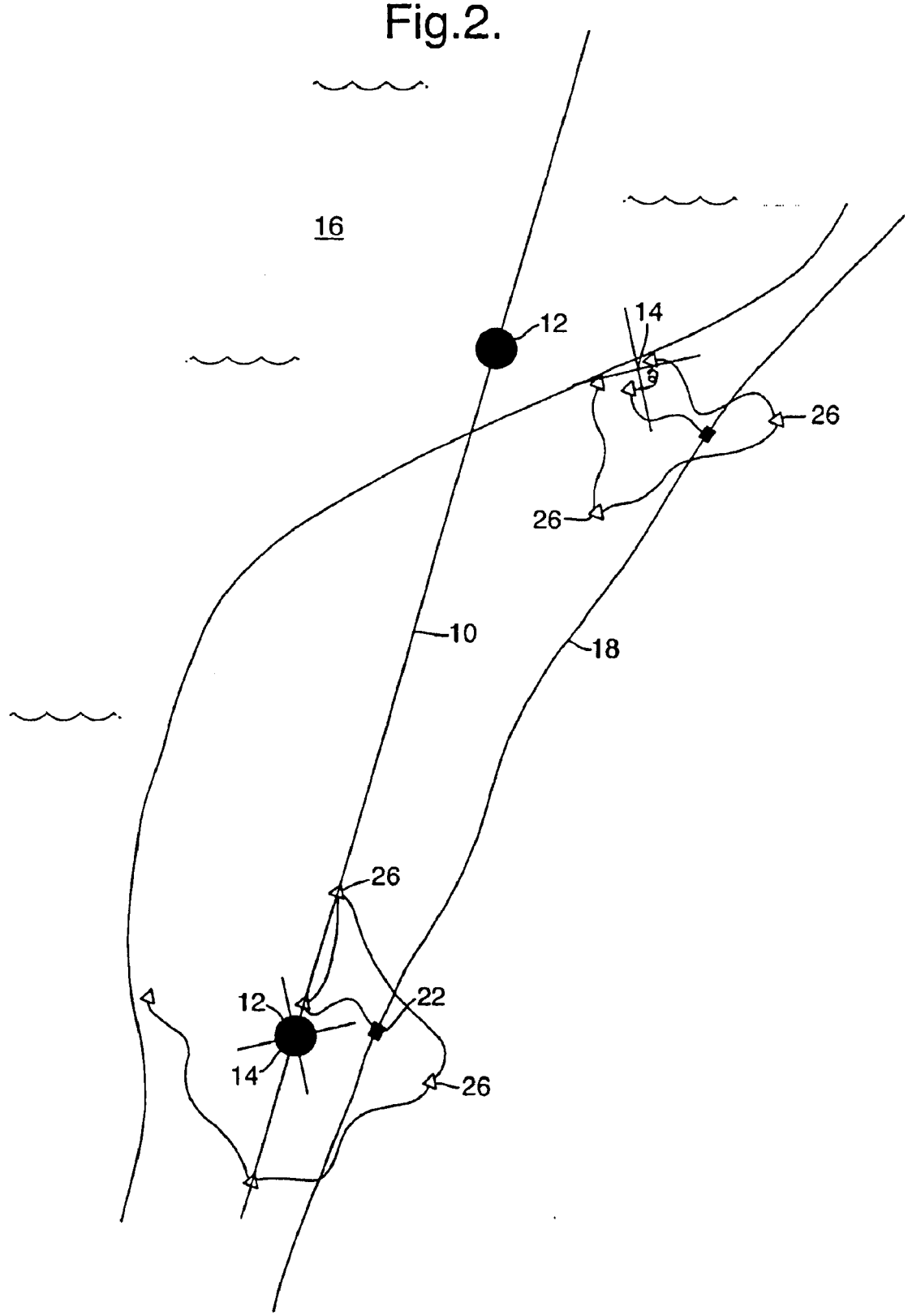
FIG. 2 is an enlarged view of area 2—2 from FIG. 1.

FIG. 2 shows an enlarged view of area 2—2 from FIG. 1. A pair of pre-planned seismic survey station locations 12 on line 10 are shown as well as their associated survey pegs 14. The lower survey peg 14 has been placed at the desired station location 12 while the upper survey peg 14 has been placed offset from the desired station location 12 because the planned station location is inaccessible due to a lake 16. A seismic data cable 18 has been laid generally along the line 10 and cable take-outs 22 are located near survey pegs 14. Geophone strings, each consisting of five interconnected geophones 26, are laid-out in the vicinity of the survey pegs 14 and are connected to the seismic data cables 18 at cable take-outs 22. The output from the geophones 26 (i.e. the seismic data acquired by the seismic sensors) is transmitted through seismic data cable 18 to the recording truck 20 where the seismic data which may or may not be pre-processed within the truck, is recorded as discussed above.

The geophones 26 in the vicinity of the lower survey peg 14 have been laid-out in what could be described as an "X" or cross pattern. In a typical seismic survey, a particular desired geophone station lay-out pattern is selected when the planned seismic sensor lay-out scheme is developed. At some survey pegs, however, it will be impossible to properly duplicate this desired pattern, typically due to terrain constraints. At the upper survey peg 14 in FIG. 2, the uppermost and left-most geophones 26 cannot be deployed in their desired positions due to the lake 16.

In conventional seismic data acquisition systems, the geophones are hardwired together and only cumulative aggregate values from the geophone string are transmitted along the seismic data cable 18. New generations of seismic acquisition equipment will provide for independent digitization for each sensor output. One possible design for these types of sensors is described in a commonly-assigned PCT International Patent Application having international Publication Number WO 98/12577, published 26 Mar. 1998. These types of digital sensors are preferably organized into a digital network.

In one potential system design, the sensors communicate to a line box via a digital take-out which acts as power distribution to the digital sensor and a router for sensor data to the line box. With this type of design, geophones may be grouped together in a sensor string similar to a conventional system. However, the information in the digital sensor string is digital instead of analog and the output of each digital sensor is available to be processed or recorded (rather than being immediately summed together with all of the outputs from the other geophones in the string to create a cumulative aggregate value).

Using this type of system, additional functions can be added at the digital take-out or near the connector of the digital geophone string to allow for improved seismic sensor positioning determination. Positioning components can allow the relative mapping between the geophone strings and the survey pegs to be determined and can allow the distances between neighboring stations to be verified. Other positioning components can allow the relative 2D positions of the digital geophones versus the survey peg and the line to be determined. The positioning components can also internally store the survey information (i.e. the 3D position and survey peg reference information). The storage of this survey information can be performed directly by the surveying crew during the initial survey operation or by an integrated satellite-based global positioning system unit. The reading of this information may then be performed by the main control computer just before, during, or just after seismic data acquisition (or at various times during the seismic data acquisition process).

Figure 3:
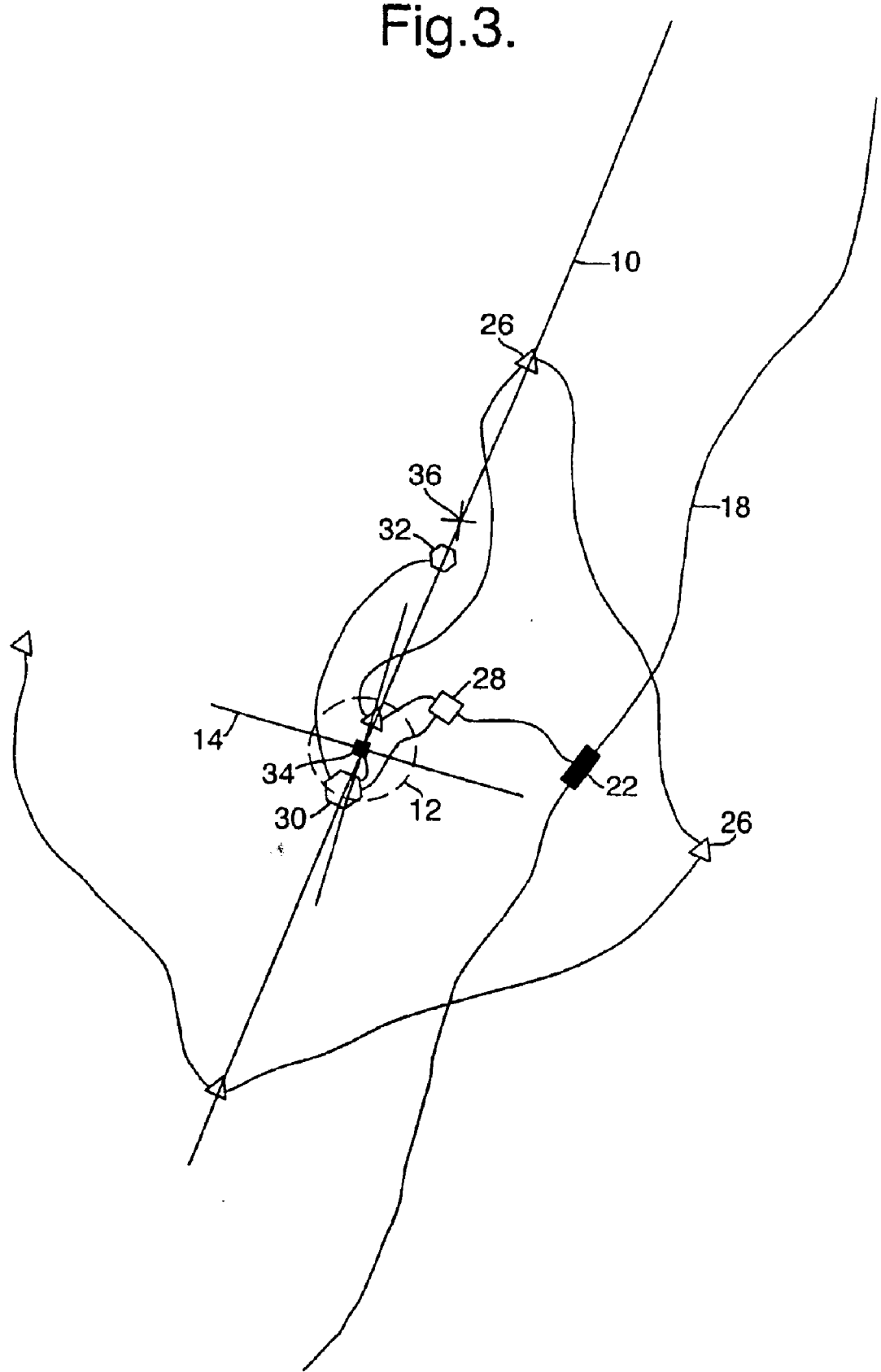
FIG. 3 is a schematic diagram of seismic data acquisition equipment in accordance with the present invention.

A portion of this type of seismic data acquisition system is shown in schematic format in FIG. 3. A pre-planned seismic survey station location 12 on line 10 is shown with a survey peg 14. A seismic data cable 18 has been laid out generally along the line 10 and a cable take-out 22 is located near the survey peg 14. A geophone string consisting of five interconnected single seismic sensors, preferably digital geophones 26, is laid-out in the vicinity of the survey peg 14 and is connected to the seismic data cable 18 at cable take-out 22. The output from the geophones 26 is transmitted through seismic data cable 18 to the equipment in the recording truck 20.

The primary components for seismic sensor positioning in this embodiment of the inventive method and apparatus are referred to as a positioning node, PNODE 28, a main acoustic transceiver, MAT 30, a secondary acoustic transmitter, SAT 32, and a survey peg electronic tag 34. As will be discussed in more detail below, these components can be tightly integrated with the type of digital geophone system technology referred to above, which can significantly reduce the cost and improve the commercial viability of the inventive method and apparatus.

These components and their associated method of use have been specifically adapted for use in a land or transition zone environment. This can be contrasted to a conventional marine seismic acquisition environment where the seismic sensors are positioned within streamers that are towed behind a seismic survey vessel. In a marine environment, the positions of the seismic sensors are effected by crosscurrents, waves, and other transient forces which cause rapid and often dramatic changes in the relative positions of the sensors with respect to the vessel. In a land or transition zone environment, however, little seismic sensor movement is expected. Any detectable sensor movement in a transition zone (shallow water marine) environment will often be of relatively small magnitude and will take place over a relatively long period of time.

In this embodiment of the inventive method and apparatus, PNODE 28 contains electronic elements that drive the geophone relative position determination process. MAT 30 and SAT 32 include acoustic transmitters that generate airborne acoustic signals using a loud-speaker, and thereby act as positioning devices. MAT 30 also includes a microphone and a connector to external devices, such as the survey peg electronic tag 34, which may comprise resistors and/or capacitors attached onto the survey peg, as discussed below. With the new type of seismic data acquisition system, PNODE 28 and the digital geophones 26 can be digital nodes on the sensor network. MAT 30 and SAT 32 are typically connected by a separate cable to PNODE 28, although in another embodiment of the present invention, the PNODE 28 and the MAT 30 are integrated into a single piece of hardware.

PNODE 28 is typically a small box that contains low power electronics. One of its primary functions is to identify the survey peg electronic tag 34 via determination of the tagged value. The physical description of the tag and the process of determining the tagged value are described below. As a secondary function, PNODE 28 controls the relative distance measurements between the MAT 30 and/or the SAT 32 and other components of the system such as the digital seismic sensors, geophones 26. For this purpose, PNODE 28 generates electronic signals that drive the MAT 30 and/or the SAT 32 which convert the electronic signals into an airborne sounds. The signals and airborne sounds can alternatively be pulse, frequency sweep, or digitally encoded sweep.

These airborne acoustic signals are detected at the geophones 26 by microphones that are attached to each of the sensors. Preferably, the microphone for each geophone 26 is connected to the same analog to digital conversion circuitry used to digitize the seismic sensor output (i.e. to produce the digital seismic data) and the system uses this same circuitry to convert the received airborne acoustic transmission produced by MAT 30 and SAT 32 into digital format. To function correctly, the geophone 26 and its associated microphone must be located relatively near the MAT 30 and the SAT 32. How near to each other these components must be positioned will depend in part, on the sensitivity of the microphones, the amplitude of the airborne acoustic transmission, and the level of background noise in the area. The acoustic signals received by the microphones attached to the geophones 26 are transmitted over the same cable that is used to transmit seismic data from the geophone to the PNODE 28 using a multi-plexing technique.

PNODE 28 also allows the distance between the MAT 30 and the SAT 32 to be determined, using again the concept of acoustic distance measurement. For this purpose, either the MAT 30 or the SAT 32 needs to be equipped with a microphone to receive the acoustic signals produced by the other component.

In the preferred embodiment, MAT 30 contains the following elements: a loudspeaker, a microphone, and a terminal connector for the survey peg electronic tag 34. There is typically no electronics in the MAT 30. The loudspeaker in the MAT 30 allows it to generate airborne signals to perform distance measurements between the MAT 30 and the other components of the seismic data acquisition system. This loudspeaker is typically driven at 1 or 2 watt (electrical) in a frequency range of between 50 to 2000 Hertz. It is preferable to have the MAT 30 and the SAT 32 produce a low frequency spread spectrum acoustic signal because this type of signal will be non-directional. This is important because the MAT and SAT will not be aligned toward any single geophone 26. In addition, the signal will be less subject to interference due to environmental noise. The MAT 30 may be rather small in size and may, for instance, have a diameter of approximately 5 centimeters. The MAT 30 may be connected to the survey peg electronic tag 34 through the use of a connector: the peg value detection principle should preferably not be affected by the presence of a film of water on the device.

MAT 30 transfers the electric analog information from the survey peg electronic tag 34 to the PNODE 28. The electronic circuitry used by the PNODE 28 to generate the airborne acoustic signal produced by MAT 30 and SAT 32 is preferably the same signal generation electronic circuitry used by the PNODE to field test the resistance and capacitance of the geophones 26. An additional amplifier may be needed to increase the output of the signal generation electronic circuitry in PNODE 28 to allow it to properly drive the loudspeakers on the MAT30 and the SAT, 32.

The MAT 30 is typically equipped with a microphone for distance measurement. The distance measurement principle is described later on. This microphone is primarily used to measure the distance between the MAT 30 and the SAT 32 at the same station, with the SAT producing the airborne acoustic transmission. This microphone can also be used to detect signals from the MAT and SAT from other geophone groups, to ensure distance measurements between geophone groups, or to determine the relative positions of the MAT 30 and the SAT 32 within a group versus other groups. The MAT 30 is typically physically sealed in a small plastic box. A thin diaphragm, such as titanium foil, may be used in front of the loud speaker and the microphone. This diaphragm allows the transmission of the acoustic signal while also allowing water sealing. The cables are also typically sealed onto the box.

The secondary acoustic transducer (SAT 32) may be physically built into the same type of box as MAT 30, but it is typically only equipped with the loudspeaker component.

The MAT 30 and the SAT 32 may be incorporated into a short independent string terminated by a connector designed to be connected into PNODE 28. The cable used for this application may be very light and may consist, for instance, of the small gauge multiple pair wires. The MAT 30 and SAT 32 cable typically transmits only low frequency analog signals to the PNODE 28, where the signals are digitized.

A preferred method for electronically reading the survey peg electronic tag 34, the location identifier, is to determine the impedance of an electrical component or components attached to the survey peg 14. The survey peg 14 may, for example, consist of a little rod with a flag. These survey pegs 14 may, for instance, be instrumented with two electrical components, either resistors or capacitors, that are connected with wires and that thereby act as survey peg electronic tags 34.

The resistance and/or capacitance values for these components can be measured by PNODE 28 using the well-known technique for measuring the resistance and capacitance of geophones. This same electrical circuitry can be used to determine the resistance or capacitance of the survey peg electronic tags 34. Each electronic tag component could have, for instance, 20 different discrete values. If two different components were used at each survey peg 14, the combination of two component values will allow the recording equipment to identify 400 different combinations of values for the pegs. A correspondence table would typically be prepared to associate the survey peg electronic tag 34 values (which vary from 1 to 400) with particular station numbers. The survey pegs 14 are typically marked visually in a permanent fashion with this "electronic tag" number. The survey peg electronic tag 34 is a position identifying device that allows the electronic tag value to be read using the seismic data cable 18 and which allows seismic sensor position coordinates to be assigned to the seismic data acquired by, the seismic sensors 26 based on the correspondence table produced by the survey team associating electronic tag values with measured position coordinates of the attached survey peg 14.

Physically, the use of a capacitor on the peg is in theory the best choice, as PNODE 28 is designed to be able to determine complex impedances at a given frequency and natural objects lack significant electrical capacitance values. By performing the test at two different frequencies, equations can be used to determine the values of the capacitors or the resistance of water in the connector. In one embodiment, the capacitor is the component of the survey peg, while the parallel resistor is the effect of a film of water on the connector. In a more simple design, two resistors could be used on the survey peg. In that case, the range of values of these resistors should be chosen so that there is no confusion when a thin film of water is present on the connector joining the survey peg electronic tag 34 to the MAT 30. The two electrical components connected to the survey peg 14 (i.e. the survey peg electronic tag 34) may be electronically connected to the PNODE 28 by wires. These wires are preferably short (not more than 50 centimeters), so that the MAT 30 may be positioned only a short distance away from the survey peg 14. This ensures more accurate positioning of the seismic sensors, geophones 26, via acoustic positioning using the survey peg as a position reference.

In the preferred implementation, the digital geophones 26 are equipped with microphones for signal reception, while the MAT 30 and the SAT 32 are equipped with speakers for generating the airborne acoustic signals. It would, of course, be possible to generate airborne acoustic signals at each of the geophones 26 and use MAT 30 and SAT 32 to receive the airborne acoustic signals generated at the geophones. The distance between a sound transmitter (a speaker) and a receiver (a microphone) can be estimated from the time of flight of the sound wave multiplied by a calculated sound velocity.

$$\text{Distance} = \text{Velocity}_{sound} * \text{Time}_{transmission}$$

where:

$\text{Velocity}_{sound} = y * R * T$ y=Adiabatic expansion coefficient for gas

R=Perfect gas constant

T=Temperature in Kelvin

For accurate measurements, the air temperature needs to be measured. This may be performed at each geophone and at each acoustic transceiver. The wind velocity also changes the acoustic wave propagation velocity. The sound reaching the receiver, however, typically travels close to the ground and is somewhat protected from the wind.

The airborne signal can be either a pulse, a sweep or a spread spectrum signal. Sweep signals reduce the instantaneous power required for the measurement, and increases the signal/noise ratio. After reception of the signals, correlations have to be performed to determined the arrival time. In the preferred design, the electronics that drive the acoustical positioning system (transmission and reception) are the same electronics used during conventional seismic data acquisition. The test signal generator normally used for geophone testing can be used, for instance, to drive the source. A special adaptation amplifier may be required to drive the audio speaker. The microphone will be multiplexed on the seismic channel of that particular sensor.

In designs that use the signal burst concept, electrical energy may be stored in a capacitor, and then suddenly discharged into the audio speaker. This principle is often used in high frequency "pulse-echo" type detector based on piezoelectric resonators and is very simple electronically. With this type of application, multiple bursts may be generated to increase the signal/noise ratio after stacking.

Normally, airborne acoustic signals will be acquired by all geophones 26 of the same group (i.e. at the same station) at the same time, and all distance measurements within the same group will be performed at the same time. This can be generalized and the distance measurement for all groups will be performed at the same time, as there is no perturbation from one group to the other one: the signal from the source of another source will come after the one of interest (as the distance is longer). Different sweeps can be used to ensure that there is no correlation error.

The correlation process (if a signal sweep is used) and the first arrival detection can be also performed in the central system. The air temperature is typically measured at the geophone 26 and the acoustic sources (MAT 30 and SAT 32) with a simple electrical probe connected to an analog to digital converter. This temperature measurement is transmitted to the central system where the temperature correction is typically performed.

This system is primarily designed to determine distance measurements inside a group of seismic sensors, and particularly for the case where each of the seismic sensors are individually measured. In this situation, geophone distances are small (often separated from the survey flag 14 by no more than 5 to 10 meters). The frequency range used with the sweep 1 method is typically from 50 Hz to 2 kHz, so that a small size speaker has no directivity: the energy of the acoustic wave is independent of the azimuth and direction. The typical accuracy is around one or two percent of the measured distance. This includes the effects of temperature correction, wind perturbation, scattering and other noises. An expected maximum range with an input power of 1 Watt could be at least 10 meters in normal noise situation (using an optimum coding method).

If the geophones 26 are laid in-line, along line 10, a single acoustic source could be used to locate the relative positions of the geophones. If the geophones 26 are laid in an areal pattern, it is preferable to use two acoustic sources. With two transmitters per group (the MAT 30 and the SAT 32), the relative position of every geophone 26 in the group can be determined via triangulation. In the preferred implementation, this distance can be measured by the acoustic method as the MAT 30 is equipped with a microphone: it can also listen to the signal generated by the SAT 32.

However, the positions of the geophones 26 can be determined only with a certain degree of accuracy (i.e. within a certain area of uncertainty). The shape and the dimension of this area of uncertainty will depend on the relative position of the geophone 26 versus the source(s) (the MAT 30 and the SAT 32). When using two sources for geophone triangulation, the geometrical 2D position can be determined without an absolute azimuth reference. To achieve an absolute azimuthal reference, SAT 32 needs to be located at a known azimuth versus MAT 30. This can be achieved by laying the SAT 32 "in-line" with respect to the MAT 30 (which is located near the survey peg 14). The "in-line" azimuth can be obtained by visual alignment with the survey peg 14 of the next group (in a pre-defined direction; either towards increasing group index, or decreasing group index). Another method for obtaining this absolute azimuthal reference is to always lay-out the SAT 32 in a predetermined azimuthal orientation with respect to MAT 30, such as due north. Positioning the SAT 32 with the proper azimuthal alignment can be left up the lay-out crew or the survey crew can place a secondary peg 36 in the proper azimuthal orientation with respect to the survey peg 14 and the lay-out crew can place the SAT 32 near this secondary peg.

If the following information is known: 1) the position of the MAT 30, 2) the distances from the MAT 30 and the SAT 32 to a particular geophone 26, 3) the distance from the SAT to the MAT, and 4) the azimuthal orientation of the SAT with respect to the MAT, then there are only two possible positions for the geophone 26 (on opposite sides of a line running through the MAT and the SAT). This "two possible positions" problem needs to be resolved only in 3D seismic applications.

There are several methods for resolving the two possible position problem to determine the true position of the geophone 26. A third acoustic source (located in a known off-line orientation with respect to the MAT 30 and the SAT 32) could be used, for instance. When the MAT 30 and SAT 32 from an adjacent station are not located in-line with the MAT and SAT of the current station, it may be possible to use one of these devices from the adjacent station as the third acoustic source.

Another procedure for obtaining the same result is to use the seismic source signal to resolve this position. In 3D seismic data acquisition, the seismic source will move around the seismic data acquisition system, so that the source azimuth (for a given geophone group) will be varying over the full range. This azimuth will be known by the acquisition computer, as the source position is one of the main parameters used to control seismic data quality. When the source azimuth is offset from the line 10, the surface wave generated by the seismic source can be used to determine the proper group orientation versus the line: this allows the line symmetry problem of acoustic positioning to be solved. The sensor configurations can be determined from the first break pick up for digital geophones 26 of each group. This is feasible as the data from each of the sensors is acquired individually. In other words, the sensor closest to the source will detect the surface break first, when compared to a more remote sensor. It should be remembered, however, that this process could be perturbed by complex statics.

Figure 4:
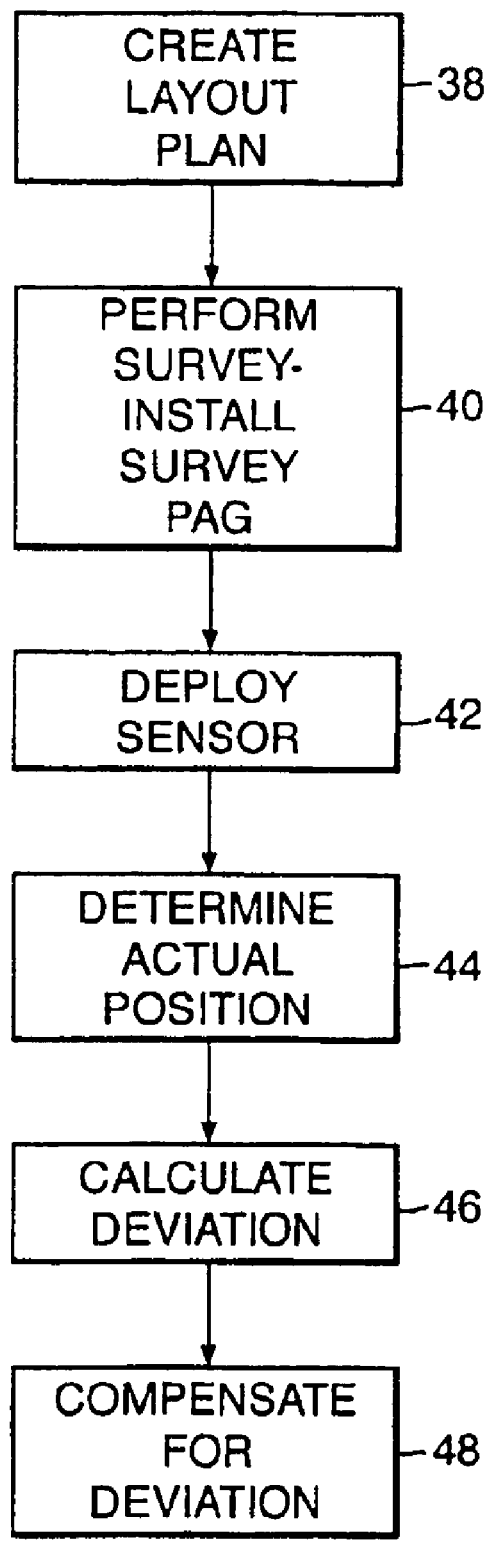
FIG. 4 is a process flow diagram of a seismic data acquisition method in accordance with the present invention.

The method of using the positioning system components will now be described in more detail. As shown in FIG. 4, a first step is the create layout plan step 38. In this step, a seismic data acquisition plan is developed that will accomplish the client's geophysical objectives (i.e. that will allow adequate images of the subsurface geology in the area to be developed) and to attempt to minimize terrain constraints on the field crews. The next step, the perform survey-install survey peg step 40, involves a survey crew visiting the site, making position measurements, and installing survey pegs that mark where the desired station locations are located on the surface of the earth.

Using the embodiment of the inventive system describe above, the survey peg 14 will have an attached survey peg electronic tag 34. There is no need to lay-out the pegs in incremental fashion versus the electronic tag values. In fact, a given peg bundle handled by a survey crew may contain several pegs with the same electronic tag values: the risk of confusion during the cross-checking process is small as the number of tag values is quite large. On the planted peg, he typically incrementally writes an incremental peg number. Finally he enters the following values in his survey table: the peg number, the true measured peg coordinates, and the peg electronic tag value.

The surveyor may also install the secondary peg 36 as a positioning reference for the secondary positioning source (SAT 32). This peg, typically having no reference value, could be installed approximately 2 meters way from the main peg in a given azimuth (a compass may be used to determine the azimuth, as 5 degrees of accuracy is typically sufficient). The distance can be estimated with an accuracy of 0.5 meter: it has no influence of the positioning process as the distance between the MAT 30 and the SAT 32 will be determine by acoustic positioning.

In the deploy sensor step 42, the sensor lay-out crew installs the other components of the seismic data acquisition equipment, including the digital geophones 26 that are placed in a given array around the survey peg 14, and the other positioning equipment (PNODE 28, MAT 30, SAT 32). The wires from the survey peg electronic tag 34 are connected to the main acoustic transducer (MAT 30): as these wires are short, the MAT 30 is required to be placed near the survey peg 14. The secondary source (SAT 32) should be laid out either in the vicinity of the secondary peg 36 or in a predetermined azimuthal direction with respect to MAT 30, as discussed above.

When all of this seismic data acquisition hardware has been laid out and connected to the central system, spread control and data acquisition can be started. This is typically done in the determine actual position step 44. Within the central system, the take-out network (or geophone group) electrical addresses are associated to the peg numbers by the conventional process. During this mapping process the information about non-linear or non-continuous hardware distribution and network configuration should be taken in account (skip gap, multiple back-bone, . . . ).

After this mapping process has been completed, the seismic data acquisition system typically performs the detection of the electronic tags for each groups in a quasi-simultaneous fashion. The central system performs a comparison between the detected tag values versus the expected tag value from the surveyor's table. If there is a discrepancy, a error exist either in the surveyor's table or a mistake has occurred during, the line equipment lay-out.

After the peg detection and mapping control steps, the relative position of the geophones in each group can be performed. First, the distance between the MAT 30 and the SAT 32 is measured. Here, the SAT 32 is transmitting the sound wave while the MAT 30 is in receiving mode (using its microphone). This process for distance measurement has been described previously.

Second, a distance measurement is made between the MAT 30 and each geophone of the group. For this purpose, the MAT 30 is transmitting the sound wave, while all the digital geophones 26 are in reception mode with their microphones. Physically, the acquisition for all geophone is typically performed simultaneously: this allows the MAT 30 to send the coded signal only once.

Third, a distance measurement is made between the SAT 32 and all of the geophones in the group. This is performed in a similar fashion as measuring the distance from the MAT 30 to each of the geophones.

Finally, all remaining distances are determined through 2D triangulation. Typically X,Y coordinates are calculated supposing that the X axis is defined by the line passing through the MAT 30 and the SAT 32. These position coordinates can be used for quality control purposes. Seismic sensors with incorrect positions can be displayed to the system observer or used in digital group forming.

The distances between MATs 30 and SATs 32 of successive groups (i.e. neighboring survey pegs 14) can also be measured using the inventive method and apparatus. For this purpose, the MAT 30 from one station is transmitting the sound wave while the MAT 30 from another station is in reception mode (with its microphone). These measurements can be used either for quality control or for digital correction. Another reason inter-group airborne acoustic transmission is used in the inventive method and apparatus is to verify that the MAT 30 and the SAT 32 in a given group are laid in the right order.

The MAT 30 and SAT 32 can also be used to confirm that the geophones 26 have been laid out in the proper order (i.e. laying out the prescribed pattern in the prescribed order). In case of error, group symmetry should be calculated for the XY coordinate. If a group has been improperly laid-out, the symmetrical XY coordinate should be determined and transmitted to the digital group forming unit. In practice, this determination is typically performed inside the unit for digital group forming.

There are two primary methods for utilizing the seismic sensor positioning information. In one method, the actual position measurements of each of the seismic sensors are explicitly taken into account in each step of the seismic data processing process. This is often extremely (and prohibitively) computer intensive.

Another method utilizes the fact that in the majority of stations in the seismic survey, the geophones will be deployed in their pre-planned locations and a processing sequence will have been established based on these pre-planned positions. One method for efficiently processing seismic data obtained under these circumstances is to compare the actual positions of the seismic sensors to their planned positions. This step is shown in FIG. 4 as the calculate deviation step 46. If the position differences are below a certain threshold level, the seismic data can be conventionally processed. If the position differences exceed a certain level, these positioning differences can be addressed by a compensate for deviation step 48. The most simple method for compensating for deviations is to ignore (i.e. either fail to record or delete) the seismic data acquired by the out of position sensor. More sophisticated approaches include repositioning the center of gravity of the group during digital data grouping output using adequate mathematical compensation schemes. Interpolation schemes can be used, for instance, to mathematically "move" the group center of gravity from its actual position to the planned position.

Many types of seismic processing procedures, such as digital filtering for noise attenuation, include assumptions regarding the geometry of the seismic sensor group. If the actual positions of the seismic sensors are substantially different from the planned or assumed positions, these procedures may be unable to properly perform their intended functions. For example, if the geophones of a particular group are laid in a bunched fashion due to terrain constraints, a ground roll removal algorithm may not be able to effectively remove ground roll at that station. In this case, it may be preferable to not process the seismic data acquired by the geophones in this group with this ground roll removal algorithm at all. In some cases, a tiered approach may be used, where relatively minor positioning deviations are corrected by a first method and relatively major positioning deviations are corrected by a second method.

In the preferred embodiment of the inventive method and apparatus, a significant effort has been made to utilize existing seismic data acquisition components to perform the new functions required to determine the positions of the seismic sensors. Examples of this use of existing components include: determining the value of the survey peg electronic tag 34 using geophone resistance and capacitance field testing electronics, generating the airborne acoustic signal using geophone field testing source generation electronics, converting the received airborne acoustic signal to digital format using the analog to digital converter used to digitize the received seismic signals, transmitting the received airborne acoustic signal over the same transmission cable used to transmit the seismic data, and using the seismic source signal to resolve the "two possible positions" ambiguity when determining seismic sensor positions in 3D seismic applications.

Numerous alternative embodiments for the equipment and method described above will now be obvious to those of ordinary skill in the art. Instead of using the resistor/capacitor peg components described above, bar code reader equipment could be used to remotely identify the survey peg. Each peg could be tagged with its own bar code: for example a bar code sticker could be glued onto the peg. PNODE 28 could similarly be equipped with a bar code reader. This method ensures an excellent coding scheme for the peg detector. The tag is low cost and can be water resistant. During lay-out of the acquisition hardware, a proper link between the bar code reader and bar code tag must be established (taking the place of the direct electrical connection used in the embodiment described above).

A further alternative to the described resister/capacitor components are inductive analog transducers. For simple applications with a steel wire survey peg, the detection can be based on the magnetic properties of the wire. The sensor could be a transformer with an air gap: the metal of peg would closes the air gap. The measurement can be either the change of impedance of the primary bobbin, or the RMS signal of the secondary. The measurement could be performed at a single frequency. For this type of measurement, the electronics would typically be located in PNODE 28. The sensor can be small (typically only a few centimeter per side) and can be connected directly to the PNODE 28 or the MAT 30. This type of system generally detects only the attachment to a peg wire and peg coding is not typically possible unless tuning or resonant circuits are molded onto the peg wire.

Electronic tags could also be used instead of the resister/capacitor peg components. These electronic tags are small electronic devices that containing a memory and have been developed for component tagging. Some of these device are ROM while others are EEPROM. These devices are typically water proof, small and low cost. In their most simple forms, a two wire connection could be used to connect the component to the PNODE. In more advanced forms, wireless digital communications can be established between a master control computer and the device, allowing to access information in the memory. An advantage to this type of wireless communication is that it eliminates the need for the sensor lay-out crew to physically connect the device to the other components of the seismic data acquisition system. These devices are typically equipped with an integrated mini antenna. Power inside the device to activate the internal electronics is typically generated by rectification of antenna received signals. Due to mode of power generation and telemetry system, the distance between the controller and the device is typically limited to a short distance (typically between 10 and 100 centimeters).

In a land seismic application, these devices could be installed on the survey peg. PNODE 28 could be equipped with the adequate electronics and antenna to control the wireless communication to the device and to obtain the peg reference value. Furthermore, the telemetry distance limitation insures that PNODE 28 is laid at a short distance from the survey peg: this allows to insure that the acoustic positioning reference is at the proper place. This digital tag will transmit its identification wireless under request from PNODE 28 via a wireless communication link. This communication could typically be achieved over 25 centimeters. The tag is a small device (having a typical diameter of 3 mm and length of 30 mm) and includes electronics for the following functions: power, memory access, telemetry control and antenna. Using this type of component, the electronic tag value is first transmitted over a wireless communication link before being transmitted to the recording truck over the seismic data cable.

If the tag contains a read/write memory, the position information can also be directly downloaded to the peg by the survey crew. The seismic data acquisition system can then directly read the position information from the survey peg electronics, thereby eliminating any need for generating a survey look-up table containing lists of peg values and peg locations. The measured position information can be obtained through the use of land-based surveying equipment or satellite-based global positioning (GPS) equipment.

In a similar manner satellite-based global positioning system (GPS) equipment can similarly be integrated directly into the inventive method and apparatus. Using this embodiment, the survey peg electronic tag 34 can consist of a GPS receiver containing a memory allowing the absolute position of survey peg 14 to be directly read by the recording truck 20.

Other types of deployment modes will also now be obvious to those of ordinary skill in the art. Instead of using separate survey peg electronic tags 34, PNODE 28 could incorporate a similar identifier value and could be left at the desired station location 12 by the survey crew. In this alternative embodiment, PNODE 28 would be the location identifier used to associate a particular data acquisition channel with the measured position coordinates of the device.

The present invention includes any novel feature or novel combination of features disclosed herein, either explicitly or implicitly.

What is claimed is:

1. An apparatus for use in seismic surveying in a land or transition zone environment, said apparatus comprising:
    a positioning device;
    a seismic sensor, capable of being placed near said positioning device; and
    means for determining the distance between said seismic sensor and said positioning device using an airborne acoustic transmission between said positioning device and said seismic sensor.

2. An apparatus as claimed in claim 1, in which said airborne acoustic transmission is produced by a speaker at said positioning device and received by a microphone at said seismic sensor.

3. The apparatus of claim 2, wherein said airborne acoustic transmission received by said microphone at said seismic sensor is converted from analog to digital format using an analog to digital converter that is also used to convert seismic signals received by said seismic sensor from analog to digital format.

4. The apparatus of claim 2 wherein said airborne acoustic transmission received by said microphone at said seismic sensor is transmitted using a cable that is also used to transmit seismic data received by said seismic sensor.

5. The apparatus of claim 1, wherein said airborne acoustic transmission is a spread spectrum acoustic signal.

6. The apparatus of claim 1, wherein said airborne acoustic transmission is a pulse frequency sweep, or digitally encoded sweep acoustic signal.

7. The apparatus of claim 1, wherein said airborne acoustic transmission is generated by signal generation circuitry that is also used to test said seismic sensor.

8. The apparatus of claim 1, further including a temperature sensor for measuring the temperature of the air near said seismic sensor or said positioning device.

9. The apparatus of claim 1, further including a survey flag and wherein said positioning device is placed near said survey flag.

10. The apparatus of claim 1, wherein said positioning device is a first positioning device and further including a second positioning device and means for determining the distance between said second positioning device and said seismic sensor using an airborne acoustic transmission between said second positioning device and said seismic sensor.

11. The apparatus of claim 10, farther including means for determining the distance between said first positioning device and said second positioning device.

12. The apparatus of claim 11, wherein said means for determining the distance between said first positioning device and said second positioning device uses an airborne acoustic transmission between said first positioning device and said second positioning device.

13. The apparatus of claim 10, wherein said first positioning device and said second positioning device are connected by a cable.

14. The apparatus of claim 10, wherein said second positioning device is placed at a predetermined azimuthal orientation with respect to said fit positioning device.

15. The apparatus of claim 10, further including means for confirming that said second positioning device has been placed at a predetermined azimuthal orientation with respect to said first positioning device.

16. The apparatus of claim 10, wherein a seismic source signal is used to resolve the line symmetry ambiguity when determining the position of said seismic sensor with respect to said first positioning device and said second positioning device.

17. The apparatus of claim 1, wherein said seismic sensor is a first seismic sensor and further including additional seismic sensors and means for determining the distance between said additional seismic sensors and said positioning device using airborne acoustic transmission between said positioning device and said additional seismic sensors.

18. The apparatus of claim 17, further including means for calculating a group center of gravity for said first seismic sensor and said additional seismic sensors.

19. The apparatus of claim 17, further including means for determining whether said first seismic sensor and said additional seismic sensors have been laid out in a prescribed order.

20. The apparatus of claim 1, wherein said seismic sensor and said positioning device are located at a first seismic station and further including an additional positioning device located at a second seismic station and means for determining the distance between a device located at said first seismic station and a device located at said second seismic station.

21. A method for use in a seismic survey in a land or transition zone environment, said method comprising the steps of:
    placing a positioning device in a particular location;
    placing a seismic sensor near said positioning device; and
    determining the distance between said seismic sensor and said positioning device using an airborne acoustic transmission between said positioning device and said seismic sensor.

22. The method of claim 21, wherein said airborne acoustic transmission is produced by a speaker at said positioning device and received by a microphone at said seismic sensor.

23. The method of claim 22, wherein said airborne acoustic transmission received by said microphone at said seismic sensor is converted from analog to digital format using an analog to digital converter that is also used to convert seismic signals received by said seismic sensor from analog to digital format.

24. The method of claim 22, wherein said airborne acoustic transmission received by said microphone at said seismic sensor is transmitted using a cable that is also used to transmit seismic data received by said seismic sensor.

25. The method of claim 21, wherein said airborne acoustic transmission is a spread spectrum acoustic signal.

26. The method of claim 22, wherein said airborne acoustic transmission is a pulse, frequency sweep, or digitally encoded sweep acoustic signal.

27. The method of claim 21, wherein said airborne acoustic transmission is generated by sisal generation circuitry that is also used to test said seismic sensor.

28. The method of claim 21, further including the step of measuring the temperature of the air near said seismic sensor or said positioning device.

29. The method of claim 21, wherein said positioning device is placed near a survey flag.

30. The method of claim 21, wherein said positioning device is a first positioning device and further including the step of determining the distance between a second positioning device and said seismic sensor using an airborne acoustic transmission between said second positioning device and said seismic sensor.

31. The method of claim 30, further including the step of determining the distance between said first positioning device and said second positioning device.

32. The method of claim 31, wherein said step of determining the distance between said first positioning device and said second positioning device uses an airborne acoustic transmission between said first positioning device and said second positioning device.

33. The method of claim 30, wherein said first positioning device and said second positioning device are connected by a cable.

34. The method of claim 30, wherein said second positioning device is placed at a predetermined azimuthal orientation with respect to said first positioning device.

35. The method of claim 30, further including the step of confirming that said second positioning device has been placed at a predetermined azimuthal orientation with respect to said first positioning device.

36. The method of claim 30, wherein a seismic source signal is used to determine to resolve the line symmetry ambiguity when determining the position of said seismic sensor with respect to said fast positioning device and said second positioning device.

37. The method of claim 21, wherein said seismic sensor is a first seismic sensor and further including additional seismic sensors and the step of determining the distance between said additional seismic sensors and said positioning device using airborne acoustic transmissions between said positioning device and said additional seismic sensors.

38. The method of claim 37, further including the step of calculating a group center of gravity for said first seismic sensor and said additional seismic sensors.

39. The method of claim 37, further including the step of determining whether said first seismic sensor and said additional seismic sensors have been laid out in a prescribed order.

40. The method of claim 21, wherein said seismic sensor and said positioning device are located at a first seismic station and further including an additional positioning device located at a second seismic station and the step of determining the distance between a device located at said first seismic station and a device located at said second seismic station.

41. The method of claim 21, further including the steps of recording seismic data acquired by said seismic sensor and assigning sensor position coordinates to said seismic data based on said distance between said seismic sensor and said positioning device.

42. The method of claim 21, further including the step of calculating a deviation between actual seismic sensor position coordinates and planned seismic sensor position coordinates.

43. The method of claim 42, further including the step of compensating for said deviation between said actual seismic sensor position coordinates and said planned seismic sensor position coordinates.

44. The method of claim 43, wherein said compensation step includes mathematically moving a group center of gravity from an actual position to a planned position.

45. The method of claim 44, wherein said compensation step includes bypassing a digital ground roll removal process.

* * * * *